June 22, 1954
C. A. REIMSCHISSEL
2,681,460
EXTERNALLY OPERATED DIE HEAD
Filed May 13, 1949
2 Sheets-Sheet 1
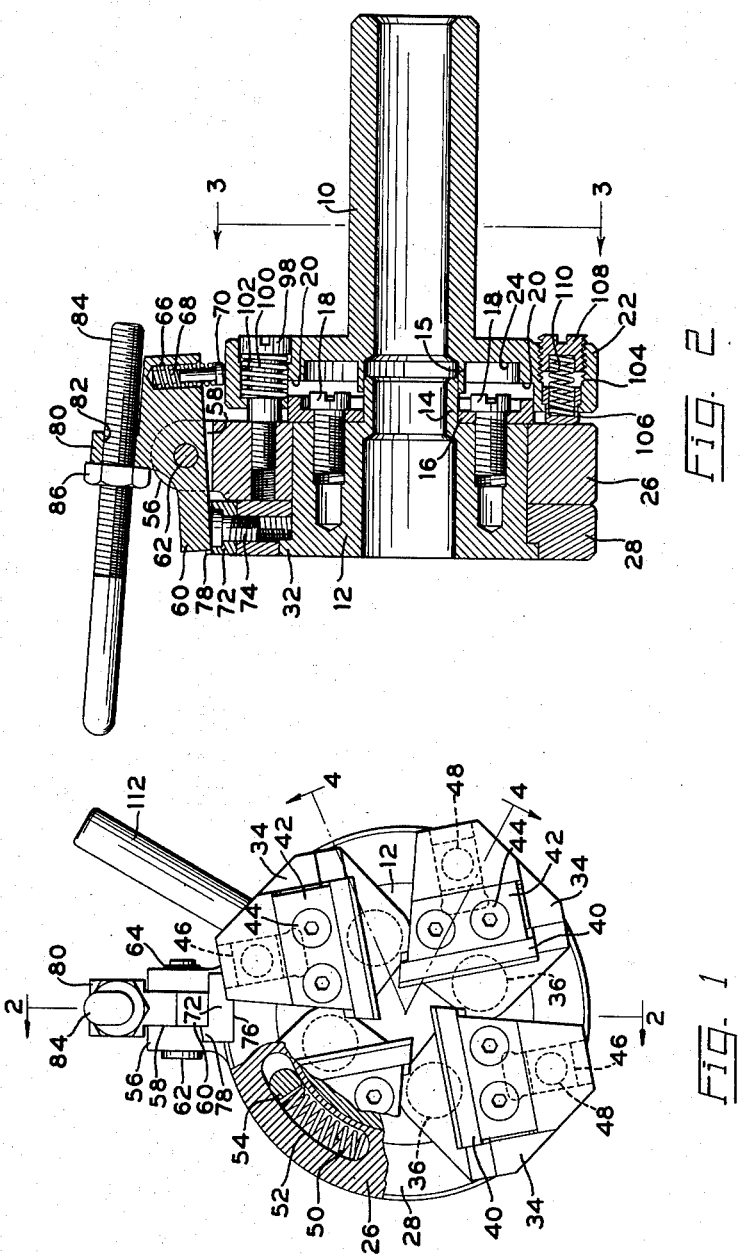
Inventor
CHARLES A. REIMSCHISSEL
By Strauch & Hoffman
Attorneys

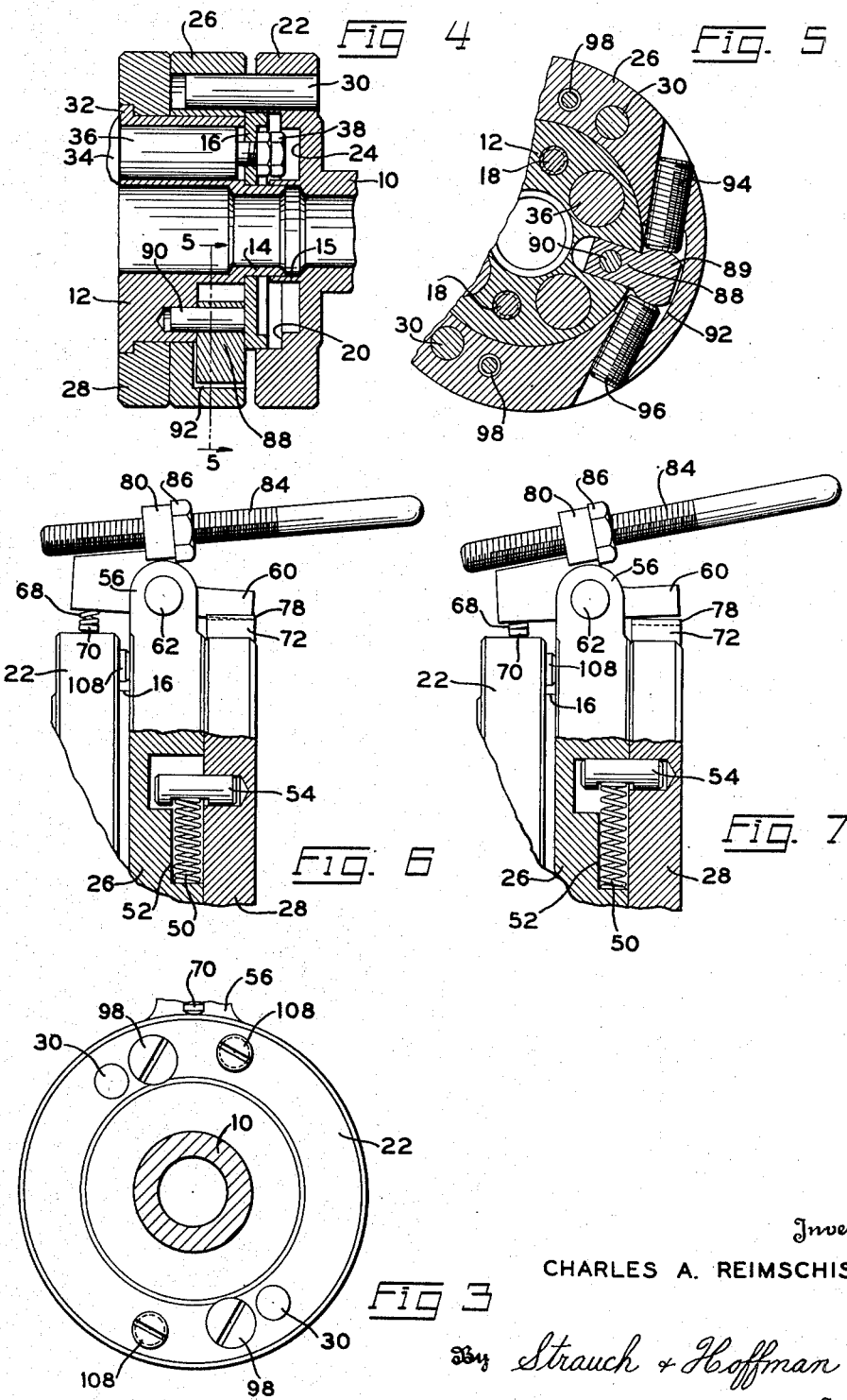

Patented June 22, 1954

2,681,460

UNITED STATES PATENT OFFICE 2,681,460

EXTERNALLY OPERATED DIE HEAD

Charles A. Reimschissel, Waynesboro, Pa., assignor to Landis Machine Company, Waynesboro, Pa., a corporation of Pennsylvania Application May 13, 1949, Serial No. 93,080

5 Claims. (Cl. 10—100)

This invention relates to thread cutting die heads and more particularly to die heads employed for the cutting of screw threads on automatic screw machines or the like.

Heretofore, die heads used for the production of threads on automatic screw machines have generally been of the "pull-off" type. In the operation of such a die head, the die spindle carrying the die head is advanced axially of the work with the chasers locked in closed position on the work until the desired length of thread has been cut. At this point the advance of the die spindle is halted while the forward part of the die head continues to advance due to the fact that the thread-cutting chasers will screw themselves further onto the work. The resulting separation of front and rear parts of the die head causes the release of the locking mechanism and the chasers are withdrawn radially from the work to permit its axial separation from the die head. A die head of this type is disclosed in the patent to Shearer et al. No. 1,894,296 January 17, 1933.

It has been found troublesome to operate such a die head under certain conditions. The two portions of the head must be partially separated by the strength of the threads already cut. If the thread length on the work is very short, if the pitch of the thread is small or if the metal is very soft, the threads formed are not numerous enough or strong enough to cause the die head to open, with the result that the thread on the work piece is often destroyed. To remedy this condition I have invented a tripping mechanism which operates from the exterior of the die head and without placing any stress on the threads of the work piece.

In such automatic screw machines, the die head is ordinarily fed toward the work piece by the action of a cam. Inaccuracies in this cam will cause the die head to advance at a rate of speed which differs from that necessary to form a thread of the proper lead. If the driving connection between die head and spindle is a positive one, shaved or otherwise damaged threads will result, particularly at the starting end of the work piece where threads must be formed before the leading action of the chasers can be used. My invention obviates this difficulty by providing a resilient connection between die head and driving member so that the axial feed of the chasers may vary temporarily from the rate of the cam feed.

Accordingly it is an object of the present invention to provide an improved thread cutting die head the opening of which is controlled by external means and without placing stresses on the work piece threads.

It is also an object of the invention to provide a thread cutting die head having a novel resilient mounting on its shank in order to improve the starting action of the die head.

A further object is to provide an improved mechanism for adjusting the chasers of a die head to the desired diameter at which threads are to be cut.

Another object is to integrate the above-mentioned features into a cooperating whole and to provide an improved die head which is at the same time simple in construction, rugged yet precise, and capable of long and continuous trouble-free operation.

Other objects and advantages of my invention will be apparent from a study of the following specifications thereof, together with the accompanying drawings, in which Figure 1 is a face view of a die head embodying my invention with certain parts broken away and in section to show the construction more clearly, Figure 2 is a longitudinal sectional view of the die head shown in Figure 1, taken substantially along the line 2—2 thereof, the chaser holders being omitted, Figure 3 is a vertical sectional view taken substantially on the line 3—3 of Figure 2, Figure 4 is a fragmentary longitudinal sectional view, taken substantially along line 4—4 of Figure 1, Figure 5 is a fragmentary sectional view substantially on the line 5—5 of Figure 4, showing the diametrical adjustment mechanism for the die head, Figure 6 is a fragmentary side elevation partly in section of the left side of the die head as it appears in Figure 1, the die head being in closed or thread cutting position and Figure 7 is a view similar to Figure 6, but with the die head in open position.

The die head is provided with a tubular shank 10, which is adapted to be rigidly secured to a non-rotating tool-holding mechanism of a machine tool, and which supports the entire die head. A head body 12 is mounted on shank 10 for limited rotational movement relative thereto, by means of a tubular extension 14 piloted in a hollow boss 15 on the shank which insures that the head body 12 and shank 10 will be retained in coaxial relationship.

A retaining plate 16 surrounds the extension 14 and is secured to the rear surface of head body 12 by means of a plurality of screws 18 (Fig. 2).

Retaining plate 16 is flanged at its circumference and is received in a counterbore 20 in the forward surface of a flange 22 of the shank 10. The flange 22 is provided with a second counterbore 24 to receive the heads of the screws 18.

An adjusting ring 26 and a chaser controlling or operating ring 28 fit over head body 12 the latter ring being mounted for rocking movement relative to ring 26 and the body 12. Pins 30 (Fig. 4) are used to prevent relative rotation between shank 10 and adjusting ring 26. These pins 30 are pressed in suitable bores in the annular flange 22 and have slidable engagement in aligned bores in the adjusting ring 26. This ring and pins 30 provide additional means guidably supporting the head body 12 from flange 22 in coaxial relation with shank 10. The chaser operating ring 28 and the adjusting ring 26 are retained in proper axial position by means of a flange 32 at the forward end of head body 12 and the retaining ring 16 secured to the rear surface of head body 12, which is of greater diameter than the internal diameter of the ring 26.

Chaser holders 34 are pivotally mounted on head body 12 by reason of the engagement of their trunnions 36 in bores in said head body. Trunnions 36 and holders 34 are axially adjusted and maintained in adjusted position by means of lock nuts 38 (Figure 4) which screw on extensions of trunnions 36 at the rearward side of retaining plate 16. This adjusting means may be similar to that shown in Patent No. 1,894,296. Chaser holders 34 are thus pivotally mounted on the forward surface of the die head and carry tangential chasers 40 securely but removably held thereon by clamps 42 and screws 44 as commonly practised in this art.

Sliding blocks 46, pivotally mounted on pins 48, pressed into and protruding forwardly from the chaser operating ring 28, are engaged in slots in the rearward surfaces of chaser holders 34. Thus the pivotal movement of chaser holders 34 to open and closed positions is initiated and controlled by oscillating movement of the chaser operating ring 28. Such pivotal movement of the chaser holders serves to withdraw the chasers 40 from engagement with a thread already cut and to reclose said chasers to thread-cutting position after the finished work piece and the die head have been axially separated from each other, all as well understood in the art.

Chaser holders 34 are normally urged outwardly from the work by a spring 50 located in a recess 52 in adjusting ring 26. Spring 50 presses at one end against a pin 54 of which one end is embedded in the operating ring 28 and the other end extends into recess 52. Since the adjusting ring 26 is keyed to shank 10 against rotation on die body 12 by means of pins 30, spring 50 urges pin 54 and therefore operating ring 28 to rock in a clockwise direction (as seen in Fig. 1) about the axis of the die head. This force is transmitted through pins 48 and blocks 46 to rock chaser holders 34 about the axes of their trunnions 36, thus to remove the cutting edges of chasers 40 from engagement with the threaded work piece.

To restrain the above-described action of spring 50 and to retain the chasers in a desired thread-cutting position, I have provided a novel latching means which is mounted externally of the other parts of the die head and which may be operated manually or by automatic means such as a cam on an automatic screw machine. The adjusting ring 26 is formed with an integral protruding boss 56 in which a slot 58, parallel to the axis of the die head, is provided to receive a locking lever 60. This lever 60 is pivotally mounted intermediate of its ends upon a pin 62 which passes through the opposite sides of boss 56 and which is provided with a head at one end and a removable collar 64 at the other end to retain it in proper axial position.

At the rearward end of lever 60, a cylindrical recess 66 is provided therein to receive a compression spring 68. A headed detent 70 is inserted into spring 68 so that said spring is held in compression between the bottom of recess 66 and the head of detent 70 which, in turn, is urged against the circumference of the flange 22 of shank 10. By this means, therefore, lever 60 is urged to rock about pin 62 in a counterclockwise direction (Fig. 2).

Rocking movement of the lever 60 by spring 68 is limited by contact of its forward end with a latch block 72, which, as shown in Figs. 1 and 2, is secured by a screw 74 in a rectangular seat 76 in the circumference of operating ring 28. Latch block 72 is utilized to limit the rocking movement of operating ring 28 in the clockwise direction under the influence of spring 50 by reason of the fact that said block is formed with an upwardly extending stop lug 78 on one end thereof as seen in Fig. 1, to engage the confronting side of lever 60 and arrest the rocking movement of operating ring 28 under the force of spring 50. It is by this means that the chasers 40 are retained in the desired position during the thread-cutting operation.

Lever 60 is provided with an integral boss 80 having a threaded opening 82 directed longitudinally of the die head. A threaded rod 84 is screwed through opening 82 and is locked in adjusted axial position by means of a lock nut 86. Thus rod 84 protrudes forwardly of the die head and, in this example, has a slight upward inclination. In this position, the forward end of rod 84 may be contacted by a stationary cam or other tripping means on the machine. Such contact during the advance of the die head on the work will cause the lever 60 to be rocked in the clockwise direction against the influence of spring 68, thus disengaging the forward end of lever 60 from the lug 78 of latch block 72 so that operating ring 28 will be rocked about the axis of the die head by spring 50 as far as is permitted by the recess 52 and the pin 54. Thus the chaser holders 34 are rocked about the axes of trunnions 36 to disengage the chasers 40 from the work piece and to permit the axial separation of said chasers and work piece. Since the ring 28 is not positively locked by internal means, as in the above mentioned patent, in case of emergency during the thread cutting operation, the die head may be opened by manual operation of the lever 60.

The body member 12 is also rocked about the head axis relative to the rings 26 and 28 to adjust the chasers 40 to the desired thread cutting position. My novel means for effecting this adjustment comprises a radially projecting block 88 (Figs. 4 and 5) mounted in a recess in one side of head body 12 by means of a pin 90. Block 88 is fitted to a close contact with both sides of the recess in head body 12, so that no independent rocking of the block 88 is possible. Block 88 at its outer end has a head 89 movable in a recess 92 in the adjusting ring 26. The opposite convex side faces of head 89 have rocking contact with the opposed set screws 94 and 96 which are threadedly engaged in suitable openings in the adjusting ring 26. Thus to change the closed or thread-cutting position of the chasers 40 it is necessary only to loosen either of screws 94 or 96 and to tighten the other thereby rocking head body 12 relative to shank 10 and rings 26 and 28 which remain stationary with respect to the machine, until the desired setting of the chasers is achieved.

My novel means for connecting the shank 10 to the front unit of the die head is best shown in Figure 2. A plurality of screws 98 are passed through the flange 22 and are threadedly engaged in the adjusting ring 26. The body of each screw 98 is of larger diameter than the threaded portion thereof so that said screw will protrude a predetermined distance from the rear surface of adjusting ring 26. A spring 100 surrounds the body of screw 98 and is contained in a suitable recess 102 in the flange 22 so that it is retained under compression between the bottom of recess 102 and the head of screw 98. In this manner head body 12 and rings 26 and 28 are resiliently urged rearwardly toward the flange 22 on shank 10.

Other openings 104 are provided in flange 22 and each is sharply reduced in diameter at its forward end to retain an axially movable spring cup 106. The rearward portion of opening 104 is threaded to receive a hollow set screw 108. Between the opposed internal surfaces of spring cup 106 and hollow set screw 108 a spring 110 is inserted to urge spring cup 106 forwardly and to cause said spring cup to exert pressure against the adjacent rear surface of adjusting ring 26. Thus springs 110 tend to urge the head body and rings forwardly relative to flange 22 and act oppositely to the above-described springs 100. It will be evident that by the adjustment of the linear position of set screws 108, the effective pressure of springs 110 may be adjusted to counterbalance the pressure of springs 100. Thus the entire front unit of the die head is resiliently mounted so that it may have a controlled axial motion in either direction independently of the force propelling the die head axially onto the work.

In machines for which the die head embodying my invention is especially adapted, as explained above, the die head is usually forced on the work by the action of a cam which should theoretically have a rate of advance proportional to the lead of the thread being cut. To avoid changing this cam for each different pitch of thread, the same cam is ordinarily used for a wide range of pitches which causes imperfect starting action in the case of most pitches. By the use of my invention, however, the die head is permitted to start slower or faster than the rate dictated by the cam. Thus if the cam tends to urge the die head at too fast a rate, the cutting forces will retard the forward portion of the head relative to the shank and compress the springs 110. If the cam tends to advance the head too slowly, the forward portion of the head will advance at a faster rate, extending the separation between adjusting ring 26 and flange 22 and compressing springs 100. To assure the proper operation of this feature, therefore, it is merely necessary to secure the required balance between springs 100 and 110 by adjusting set screws 108.

The operation of my device is as follows. After the chasers have been properly mounted in their holders and adjusted to the desired cutting diameter as described above, the die head is mounted in the machine and the threading operation is started. The die spindle feeding mechanism causes the die head to advance toward the work until the cutting operation begins. The resiliency of the forward part of the die head, due to springs 100 and 110, permits the chasers to advance at the proper rate onto the work.

When the desired length of thread has been cut, the trip rod 84, which has previously been adjusted to the proper length, strikes a stationary part of the machine and the lever 60 is thereby rocked in a clockwise direction (as seen in Fig. 2). This releases the lug 78 of latch block 72 and operating ring 28 is rocked in the clockwise direction (as seen in Fig. 1) under the influence of spring 50 against pin 54. As a consequence, pins 48 and blocks 46 rock chaser holders 34 about the axes of trunnions 36 and the die head is opened. The position of the parts when the die head is open is shown in Figure 7.

To reset the die head to closed or thread cutting position, it is necessary to rock operating ring 28 in the counter clockwise direction, (as seen in Fig. 1) by use of the closing handle 112 which is securely attached to said ring. This handle may be moved by a cam suitably located on the machine frame, which cam will be contacted by the handle 112 when the die spindle is withdrawn axially from a previously finished work piece. Rocking of ring 28 in this manner simultaneously causes blocks 46 to rock chaser holders 34 to closed position and pin 54 to compress spring 50. When closed position is reached by the chaser holders 34, the latch block 72 will also be in its original position so that lever 60 is resiliently held by spring 68 in engagement with lug 78 to retain the die head in closed or thread cutting position for the start of another threading operation.

From the above description it will be seen that my invention provides a greatly simplified die head of this type in which the head body remains axially stationary relative to the shank in the opening of the die head so that the formed thread is not subjected to distorting strain or stress. By the resilient mounting of the head body on the shank provision is made for starting the thread cutting operation at the correct predetermined pitch, notwithstanding variation in the rate of relative axial movement between the head supporting shank and the work. Thus uniform accuracy of the thread throughout its length will be obtained. My invention also provides an easily operable and less expensive means for diametrically setting the chasers than that heretofore commonly used for this purpose.

These several novel features of the present invention are coordinated in a very simple and rugged assembly which, in its preferred embodiment, has been found functionally efficient and reliable to achieve the above noted objects and purposes thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a die head, a body, tangential chasers and holders therefor pivotally mounted on said body, an oscillatable opening and closing ring mounted on said body and operatively connected with the chaser holders to move the chasers toward and away from the axis of said body, resilient means urging said opening and closing ring in one direction with respect to said body to move said chasers away from the axis of said body, an adjusting ring rotatably mounted on said body, a lever mounted on an externally projecting portion of said adjusting ring, a stop lug on the periphery of said opening and closing ring, said stop lug having a radially extending stop surface urged by said resilient means against the side of said lever whereby said stop lug limits movement of said opening and closing ring in said one direction to maintain said chasers in a predetermined working position, cooperating means on said body and said adjusting ring to rotatably adjust said adjusting ring relative to said body to adjust said working position of the chasers, and means mounting said lever for rocking movement out of engagement with said stop surface of said stop lug to permit independent movement of said opening and closing ring in said one direction with respect to said body under the influence of said resilient means to move said chasers outwardly away from said working position.

2. The combination according to claim 1 together with spring means biasing said lever to a normal position for engagement with said stop lug.

3. The combination of claim 1 together with a trip rod adjustably connected to said lever and projecting forwardly of the die head.

4. The combination according to claim 1 wherein the adjusting means for said adjusting ring comprises a member fixed to said body, said member projecting radially into an internal recess in said adjusting ring, and relatively adjustable elements carried by said adjusting ring and extending into said recess in bearing contact with the opposite side faces of said member.

5. In a die head, a body, tangential chasers and holders therefor pivotally mounted on said body, an oscillatable opening and closing ring mounted on said body and operatively connected with the chaser holders to move the chasers toward and away from the axis of said body between a working position and a full open position, resilient means urging said opening and closing ring in one direction with respect to said body to move said chasers toward said full open position, an adjusting ring rotatably mounted on said body, a lever mounted on an externally projecting portion of said adjusting ring, a stop lug on the periphery of said opening and closing ring, said stop lug having a radially extending stop surface urged by said resilient means against one side of said lever whereby said stop lug limits movement of said opening and closing ring in said one direction to maintain said chasers in a predetermined working position, cooperating means on said body and said adjusting ring to rotatably adjust said adjusting ring relative to said body to adjust said working position of the chasers, means mounting said lever for rocking movement to a retracted position out of engagement with said stop surface of said stop lug to permit independent movement of said opening and closing ring in said one direction under the influence of said resilient means to move said chasers to said full open position, and means for supporting said lever in said retracted position in said full open position of said opening and closing ring to permit automatic movement of said opening and closing ring toward said working position.

References Cited in the file of this patent

UNITED STATES PATENTS

| Number | Name | Date |
| --- | --- | --- |
| 1,146,871 | Hart | July 20, 1915 |
| 1,154,568 | Harrington | Sept. 21, 1915 |
| 1,665,973 | Newman | Apr. 10, 1928 |
| 1,760,568 | Shearer | May 27, 1930 |
| 1,782,472 | Koontz | Nov. 25, 1930 |
| 1,787,932 | Breitenstein | Jan. 6, 1931 |
| 1,874,643 | Shearer | Aug. 30, 1932 |
| 1,894,296 | Shearer et al. | Jan. 17, 1933 |
| 1,923,074 | Breitenstein | Aug. 22, 1933 |
| 1,979,024 | Bysshe et al. | Oct. 30, 1934 |
| 2,087,084 | Cote | July 13, 1937 |
| 2,151,388 | Loughlin | Mar. 21, 1939 |
| 2,256,611 | Cote | Sept. 23, 1941 |

FOREIGN PATENTS

| Number | Country | Date |
| --- | --- | --- |
| 137,918 | Great Britain | Jan. 29, 1920 |